(12) United States Patent  
Katori et al.

(10) Patent No.: US 7,294,603 B2  
(45) Date of Patent: *Nov. 13, 2007

(54) PROCESS FOR PRODUCTION OF CONDUCTIVE CATALYST PARTICLES, PROCESS FOR PRODUCTION OF CATALYST ELECTRODE CAPABLE OF GAS DIFFUSION, APPARATUS FOR PRODUCTION OF CONDUCTIVE CATALYST PARTICLES, AND VIBRATING APPARATUS

(75) Inventors: Kenji Katori, Kanagawa (JP); Toshiaki Kanemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 10/477,840

(22) PCT Filed: May 16, 2002

(86) PCT No.: PCT/JP02/04726

§ 371 (c)(1),  
(2), (4) Date: Dec. 22, 2003

(87) PCT Pub. No.: WO02/094438

PCT Pub. Date: Nov. 28, 2002

(65) Prior Publication Data

US 2004/0259730 A1  Dec. 23, 2004

(30) Foreign Application Priority Data

May 18, 2001 (JP) .............................. 2001-148613  
Apr. 23, 2002 (JP) .............................. 2002-120822

(51) Int. Cl.  
*B01J 23/00* (2006.01)  
*B01J 23/40* (2006.01)  
*B01J 21/18* (2006.01)  
*H01M 4/00* (2006.01)

(52) U.S. Cl. .................. 502/185; 502/182; 429/40; 429/44

(58) Field of Classification Search ........... 502/182, 502/185, 327, 332–334, 339, 352, 355, 439; 427/248.1, 212; 429/40, 44  
See application file for complete search history.

(56) References Cited

U.S. PATENT DOCUMENTS 3,382,105 A * 5/1968 McBryar et al. ............... 429/30

(Continued)

FOREIGN PATENT DOCUMENTS

JP  2000-109969  4/1800

(Continued)

OTHER PUBLICATIONS

Long Y. Chiang et al., *Multi-hydroxy Additions onto C60 Fullerene Molecules*, J. Chem. Soc., 1992 pp. 1791-1793.

(Continued)

*Primary Examiner*—Cam N. Nguyen  
(74) *Attorney, Agent, or Firm*—Bell, Boyd & Lloyd LLP (57) ABSTRACT

A process for production of conductive catalyst particles, a process for production of a catalyst electrode capable of gas diffusion, an apparatus for production of conductive catalyst particles, and a vibrating apparatus. The process can effectively and uniformly coat the particles of a conductive powder with a catalytic substance.

40 Claims, 8 Drawing Sheets

U.S. PATENT DOCUMENTS

| | | | | |
|---|---|---|---|---|
| 5,061,778 A | * | 10/1991 | Uchida et al. | 528/45 |
| 2003/0031917 A1 | * | 2/2003 | Katori et al. | 429/44 |
| 2004/0142230 A1 | * | 7/2004 | Katori et al. | 429/42 |

FOREIGN PATENT DOCUMENTS

| | | |
|---|---|---|
| JP | 52-20990 | 2/1977 |
| JP | 54-82394 | 6/1979 |
| JP | 5-36418 | 2/1993 |
| JP | 2000-293517 | 10/2000 |
| JP | 2001-87666 | 4/2001 |
| JP | 2002-110175 | 4/2002 |

OTHER PUBLICATIONS

Long Y. Chiang et al., Efficient Synthesis of Polyhydroxylated Fullerene Derivatives via Hydrolysis of Polycyclosulfated Precursors, American Chem. Society, 1994, pp. 3960-3969.

* cited by examiner

PROCESS FOR PRODUCTION OF CONDUCTIVE CATALYST PARTICLES, PROCESS FOR PRODUCTION OF CATALYST ELECTRODE CAPABLE OF GAS DIFFUSION, APPARATUS FOR PRODUCTION OF CONDUCTIVE CATALYST PARTICLES, AND VIBRATING APPARATUS

CROSS REFERENCES TO RELATED APPLICATIONS

The present application claims priority to Japanese Patent Document Nos. P2001-148613 filed on May 18, 2001; and P2002-120822 filed on Apr. 23, 2002, the disclosures of which are herein incorporated by reference.

BACKGROUND OF THE INVENTION

The present invention relates to a process for production of conductive catalyst particles, a process for production of a catalyst electrode capable of gas diffusion, an apparatus for production of conductive catalyst particles, and a vibrating apparatus.

It has been usual practice to produce a catalyst electrode capable of gas diffusion from catalyst particles composed of carbon powder (as a conductive powder) and platinum (as a catalyst) supported thereon, in combination with a water-repellent resin (such as fluorocarbon resin) and an ionic conductor, by forming them into a sheet, for example, as disclosed in Japanese Patent Laid-open No. Hei 5-36418 or applying them onto a carbon sheet.

The electrode thus produced may be used as an electrode for hydrogen decomposition as a constituent of a fuel cell of solid polymer type or the like. In this case, the catalyst (such as platinum) ionizes fuel, giving rise to electrons, which flow through the conductive carbon. The catalyst also ionizes hydrogen, giving rise to protons ($H^+$), which flow into the ionic conducting membrane through the ionic conductor. These actions need interstices for passage of gas, carbon that conducts electricity, an ionic conductor that conducts ions, and a catalytic substance to ionize fuel and oxidant.

A typical way to make carbon powder (as a conductive powder) support platinum (as a catalytic substance) thereon is by dipping carbon powder in a solution containing platinum (in the form of ions), which is followed by reduction and thermal treatment. The processed carbon powder carries platinum fine particles on the surface thereof, for example, as disclosed in Japanese Patent No. 2879649.

The conventional method mentioned above, however, has the disadvantage of requiring the steps for reduction and thermal treatment. With thermal treatment at an inadequately low temperature, it renders platinum poor in crystallinity, which results in mediocre catalytic characteristics.

Moreover, the fact that the carbon powder and the ionic conductor need to be in contact with each other because the catalytic substance like platinum ionizes fuel to give electrons, which flow through the conductive carbon, and also ionizes hydrogen to give protons ($H^+$), which reach the ionic conducting membrane through the ionic conductor, makes it necessary to apply the ionic conductor to the carbon powder on which platinum has been supported. Unfortunately, platinum (as a catalytic substance) functions only at the part which is in contact with gas, and consequently, it becomes unfunctional when it is isolated from gas by the ionic conductor.

There is an alternative method, which consists of coating carbon powder with an ionic conductor and then causing the coated carbon powder to support platinum. This method has the disadvantage of requiring thermal treatment to improve the crystallinity of platinum. However, thermal treatment at a temperature sufficiently high for this purpose deteriorates the ionic conductor which is usually poor in heat resistance.

Figure 11A:
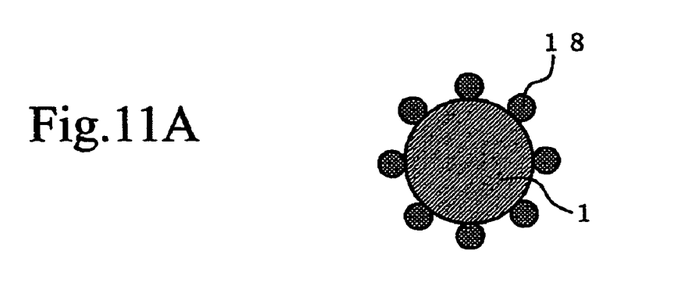
FIGS. 11A and 11B are schematic sectional view showing a conductive catalyst particle produced by a conventional method which consists of a carbon article and platinum particles supported thereon.

FIG. 11A is a schematic sectional view showing a conductive catalyst particle (produced by the conventional method) which consists of a carbon particle (conductive powder 1) and platinum particles (catalytic substance 18) supported thereon. Also, FIG. 11B is a schematic sectional view showing a conductive catalyst particle, in which the carbon particle is coated with an ionic conductor 19 and the platinum is supported thereon.

It is obvious from FIG. 11A that the conductive catalyst particles support on the surface thereof platinum in spherical form which has precipitated from the liquid phase. These platinum particles readily separate from the surface of carbon powder. Moreover, production in this manner requires a relatively large amount of platinum. In addition, platinum in spherical form performs its catalytic function only on its surface but does not function inside. Therefore, it has a low catalytic efficiency for its quantity. Another problem is that platinum enters pores in the surface of the carbon powder. (This is not shown.)

Figure 11B:
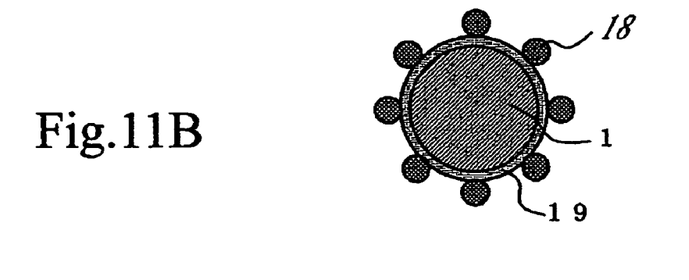

Further, causing the carbon powder to support platinum after application of the ionic conductor 19, as shown in FIG. 11B, necessitates thermal treatment to improve the crystallinity of platinum. Unfortunately, the ionic conductor 19 is usually poor in heat resistance and subject to deterioration upon heating at a temperature high enough for the desirable crystallinity of platinum.

A catalytic electrode capable of gas diffusion which efficiently works with a small amount of catalyst is disclosed in Japanese Patent Application No. 2000-293517.

Figure 12:
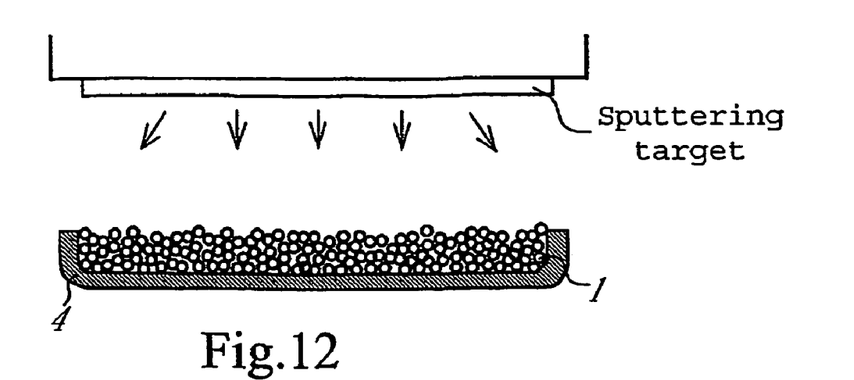
FIG. 12 is a schematic sectional view showing an apparatus for producing conductive catalyst particles according to the invention as disclosed in Japanese Patent Application No. 2000-293517.

As disclosed, physical vapor deposition, such as sputtering as shown in FIG. 12, makes a catalytic substance adhere to the surface of the conductive powder 1.

However, the production process as disclosed therein consists of depositing the catalytic substance only on the surface of the conductive powder 1 by physical vapor deposition as shown in FIG. 12. Deposition in this manner, it is believed, takes place only on the surface of the conductive powder 1 lying in the uppermost layer in the container 4. Therefore, uniform deposition of the catalytic substance on the entire conductive powder placed in the container encounters difficulties.

A need therefore exists to provide improved processes and apparatuses for producing conductive catalyst particles.

SUMMARY OF THE INVENTION

The present invention provides a process for production of conductive catalyst particles, a process for production of a catalyst electrode capable of gas diffusion, an apparatus for production of conductive catalyst particles, and a vibrating apparatus, wherein the process permits the catalytic substance to be uniformly deposited on all of the conductive powder.

The present invention is directed to a process for producing conductive catalyst particles by causing a catalytic substance to adhere to the surface of conductive powder by physical vapor deposition while vibrating the above-mentioned conductive powder, wherein the above-mentioned conductive powder undergoes vibration together with a vibration amplifying means arranged on a vibrating plane. The present invention is directed also to an apparatus used for the process for producing conductive catalyst particles according to the present invention. This apparatus includes means to vibrate conductive powder, means for physical vapor deposition to cause a catalytic substance to adhere to the surface of the conductive powder, and means to amplify vibration.

The process for production of conductive catalyst particles includes a step of vibrating a conductive powder together with balls and a step of causing a catalytic substance to adhere to the surface of the conductive powder by physical vapor deposition.

The apparatus for production of conductive catalyst particles includes an approximately flat container to hold a conductive powder, vibration amplifying means in approximately spiral, concentric, or turned-around form which is fixed to the approximately flat container, with at least a part thereof remaining unfixed, means to vibrate the above-mentioned approximately flat container, and means to cause a catalytic substance to physically adhere to the above-mentioned conductive powder.

The present invention is also directed to a vibrating apparatus which includes means to vibrate a conductive powder and a means to amplify vibration.

The present invention is directed to a process for production of a catalyst electrode capable of gas diffusion, the above-mentioned process including a step of causing a catalytic substance to adhere to the surface of a conductive powder by physical vapor deposition while vibrating the above-mentioned conductive powder together with vibration amplifying means on a vibrating plane, thereby giving conductive catalyst particles, and a step of preparing a catalyst electrode capable of gas diffusion which contains the thus obtained conductive catalyst particles.

As mentioned above, the process of the present invention includes a step of causing a catalytic substance to adhere to the surface of a conductive powder by physical vapor deposition while vibrating the above-mentioned conductive powder together with vibration amplifying means on a vibrating plane. The advantage of this step is that the above-mentioned conductive powder is thoroughly mixed by vibration without staying at one place on the above-mentioned vibrating plane. Mixing in this manner causes the particles of the conductive powder, in outside layers as well as inside layers, to be exposed, so that the catalytic substance uniformly adheres to the above-mentioned conductive powder.

As mentioned above, the process of the present invention includes a step of causing a catalytic substance to adhere to the surface of a conductive powder by physical vapor deposition. The advantage of this step is that a catalytic substance with good crystallinity adheres at a low temperature only to the surface of the above-mentioned conductive powder effectively without entering pores existing in the surface of the above-mentioned conductive powder. The resulting conductive catalyst particles exhibit good catalytic actions even when used in a small amount. In addition, they provide a sufficient area for contact between the above-mentioned catalytic substance and gas. This implies that the above-mentioned catalytic substance has a large specific surface area contributing to reaction and hence shows enhanced catalytic capability.

A process for producing conductive catalyst particles by causing a catalytic substance such as platinum to adhere to the surface of conductive powder such as carbon by physical vapor deposition such as sputtering while vibrating the conductive powder, wherein the conductive powder undergoes vibration together with vibration amplifying means such as balls arranged on a vibrating plane according to an embodiment. A process for producing a catalyst electrode capable of gas diffusion which has a step of incorporating the conductive catalyst particles into it according to an embodiment. An apparatus for producing conductive catalyst particles which includes means to vibrate conductive powder, means for physical vapor deposition to cause a catalytic substance to adhere to the surface of the conductive powder, and means to amplify vibration according to an embodiment.

Additional features and advantages of the present invention are described in, and will be apparent from, the following Detailed Description of the Invention and the figures.

DETAILED DESCRIPTION OF THE INVENTION

The invention will be described in more detail with reference to the embodiments thereof.

The physical vapor deposition mentioned above according to an embodiment should preferably be carried out by a sputtering process which employs the above-mentioned catalytic substance as the target. The sputtering process permits easy production with high productivity and forms film satisfactorily.

The sputtering process mentioned above may be replaced by a pulsed laser deposition process, which permits easy control in film formation and forms film satisfactorily or other suitable process.

The sputtering process or the pulsed laser deposition process permits a catalytic substance with good crystallinity to adhere at a low temperature only to the surface of the conductive powder (without entering pores existing in the surface of the conductive powder). Therefore, the resulting conductive catalyst particles produce good catalytic action even when used in small quantities. Moreover, they provide a sufficient area for contact between the catalytic substance and gas. This makes the catalytic substance possess a large specific surface area contributing to reaction, which leads to enhanced catalytic capability.

The means for physical vapor deposition may be at least one of the vacuum deposition means, the sputtering apparatus, the pulsed laser deposition apparatus and the like.

The process according to an embodiment of the present invention, which includes the step of causing the catalytic substance to adhere to the surface of conductive powder, has the advantage over the process of forming noble metal film on a carbon sheet by sputtering, which is disclosed in a Japanese Translations of PCT for Patent No. Hei 11-510311. In this regard, it is believed that the present invention makes the catalytic substance have a larger specific surface area contributing to reaction, and this leads to enhanced catalytic capabilities.

Figure 1:
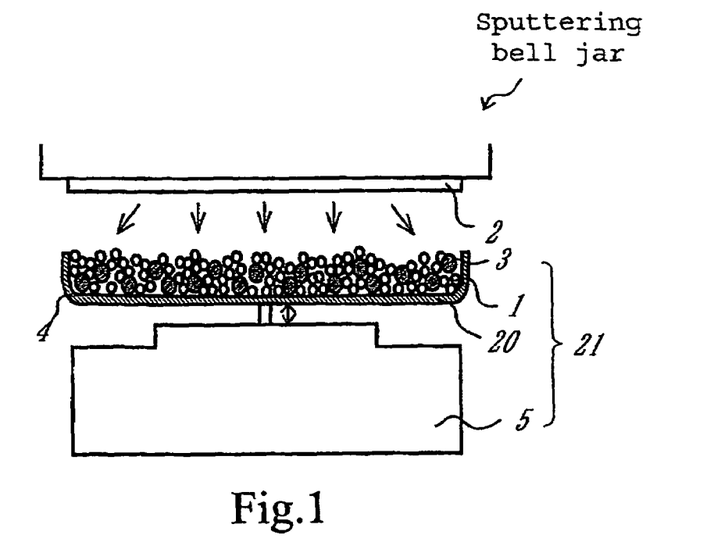
FIG. 1 is a schematic sectional view showing an apparatus for producing conductive catalyst particles according to an embodiment of the present invention.

FIG. 1 is a schematic sectional view showing the apparatus for producing conductive catalyst particles according to an embodiment the present invention.

The apparatus shown in FIG. 1 is designed such that the surface of the conductive powder 1 is coated with the catalytic substance by physical vapor deposition such as sputtering which employs the catalytic substance as the target 2. This apparatus employs one or more members, such as one or more spherical-shaped members including balls 3 or other suitable material with a smooth surface as the vibration amplifying means. In an embodiment, the conductive powder 1 and the balls 3 are mixed together, and the resulting mixture is placed on the vibrating plane 20 in the container 4 having an approximately flat bottom. The vibrating plane 20 should preferably be vibrated by a transducer 5 such as an electromagnetic coil or a supersonic horn. The vibrating apparatus 21 constructed as mentioned above moves the balls 3, thereby mixing them with the conductive powder 1 and causing the conductive powder 1 to flow without staying at one place on the vibrating plane. Moreover, the mixing by the balls causes the particles of the conductive powder 1, in outside layers as well as inside layers, to be exposed, so that the catalytic substance uniformly adheres to the entire conductive powder 1.

In an embodiment, he balls 3 used for mixing preferably include ceramic balls, metallic balls and/or the like and range from about 1 mm to about 10 mm in diameter. It should be appreciated that any suitable material can be utilized in any suitable size and shape.

Figure 2:
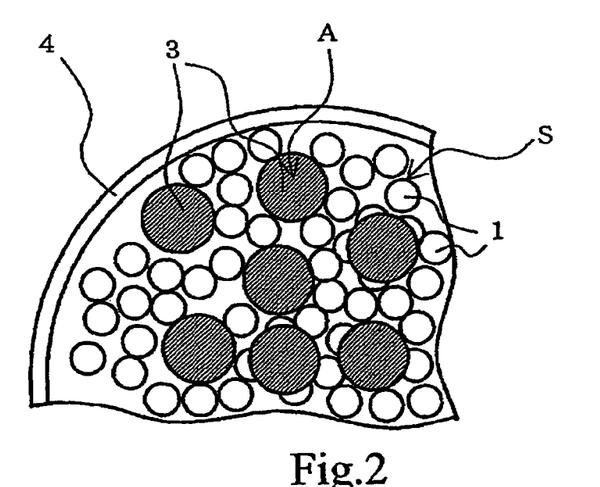
FIG. 2 is a schematic diagram showing the container used in the apparatus for production according to an embodiment of the present invention.

FIG. 2 is a partly enlarged schematic diagram showing the container 4 containing the conductive powder and the balls as the vibration amplifying means. As shown in FIG. 2, the conductive powder and the balls should be mixed together such that the total area A of the balls account for about 30% to about 80% of the area S in which the conductive powder is distributed. If this ratio is excessively small, satisfactory mixing is not achieved. Conversely, if this ratio is excessively large (with a small proportion of the conductive powder 1), sputtering for adhesion of the catalytic substance is poor in efficiency (which leads to a low productivity of the catalyst particles carrying the catalytic substance).

Figure 3:
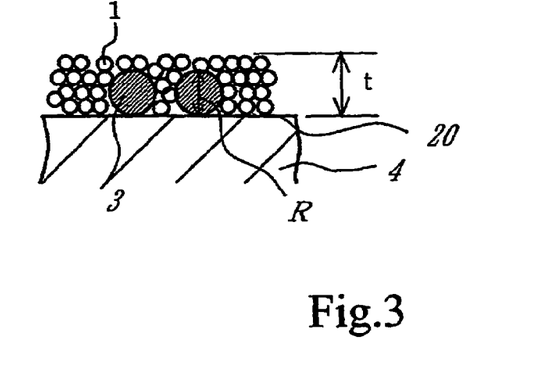
FIG. 3 is a schematic sectional view showing the apparatus for production according to an embodiment of the present invention.

FIG. 3 is a partly enlarged schematic sectional view showing the container 4 which holds the conductive powder 1 and the balls 3 as the vibration amplifying means. As shown in FIG. 3, the balls 3 should preferably have a diameter (R) which is equivalent to about 10% to about 70% of the layer thickness (t) of the conductive powder 1. The balls 3 with a diameter outside this range are undesirable as in the case of surface ratio mentioned above.

The transducer 5 should apply vibration to the conductive powder 1 and the balls 3 (as vibration amplifying means) at a frequency of about 5 Hz to about 200 Hz and an amplitude of ±(0.5 to 20) mm for their thorough mixing. (This applies to other embodiments mentioned later.)

Sputtering in combination with vibration permit the catalytic substance to adhere more uniformly to the surface of the conductive powder than sputtering without vibration. With the ball diameter smaller than about 1 mm or larger than about 10 mm, the frequency less than about 5 Hz or more than about 200 Hz, and the amplitude less than about ±0.5 mm, vibration does not shake the conductive powder strongly but permits it to stay on the bottom of the container. In this situation, uniform film formation is unattainable. Moreover, vibration with an amplitude in excess of about 20 mm may force out the conductive powder, which leads to a decreased yield.

In the production process according to an embodiment of the present invention, the above-mentioned balls as the vibration amplifying means may be replaced by a flat object of wire in a form resembling a spiral, concentric circle, or turned-around pattern. This flat object is installed on the bottom of the container in such a way that at least part of it remains unfixed (for three-dimensional movement or vibration without restrictions). In operation, the conductive powder is placed on this flat object which is allowed to vibrate.

Figure 4A:
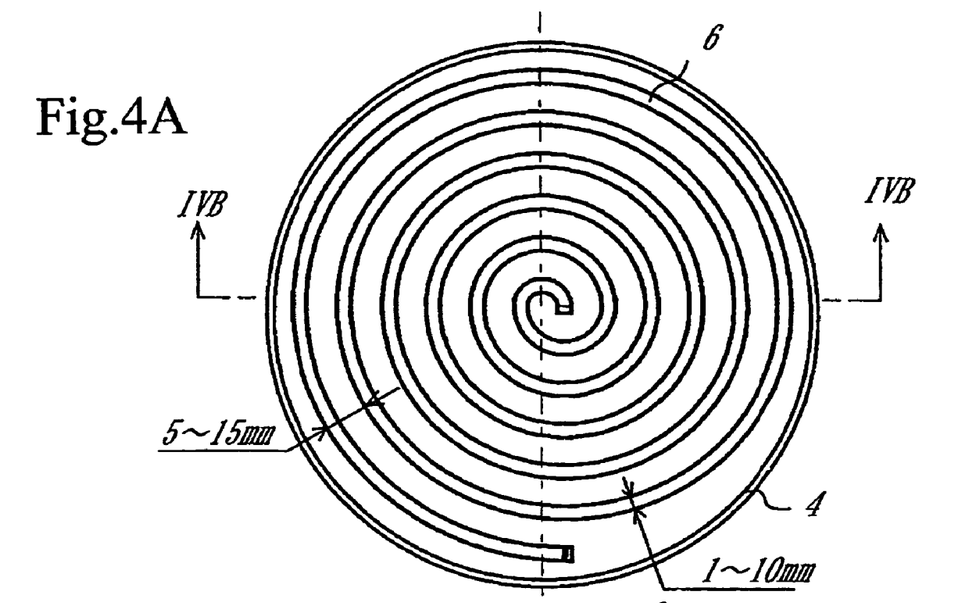
FIGS. 4A and 4B are schematic sectional views showing the vibrating apparatus used in the apparatus for production according to an embodiment of the present invention.
Figure 4B:
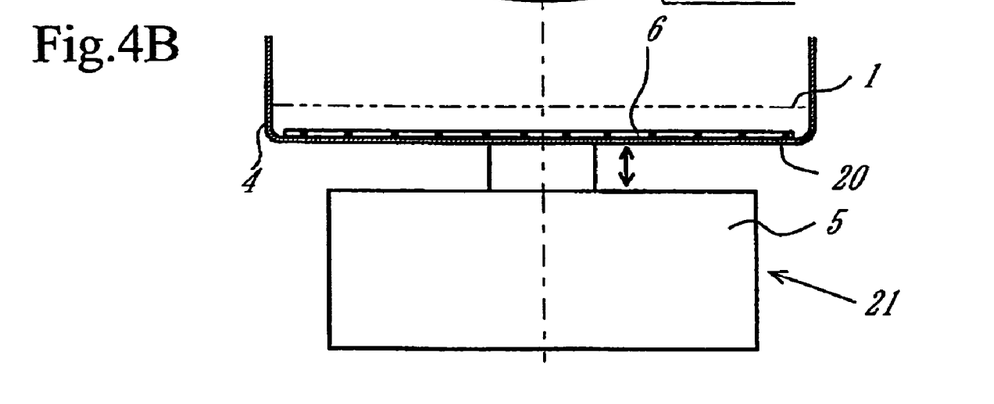

FIGS. 4A and 4B are schematic sectional views showing the vibrating apparatus according to an embodiment of the present invention. This apparatus is provided with the flat object 6 (as the vibration amplifying means) made of wire in spiral form.

Figure 5A:
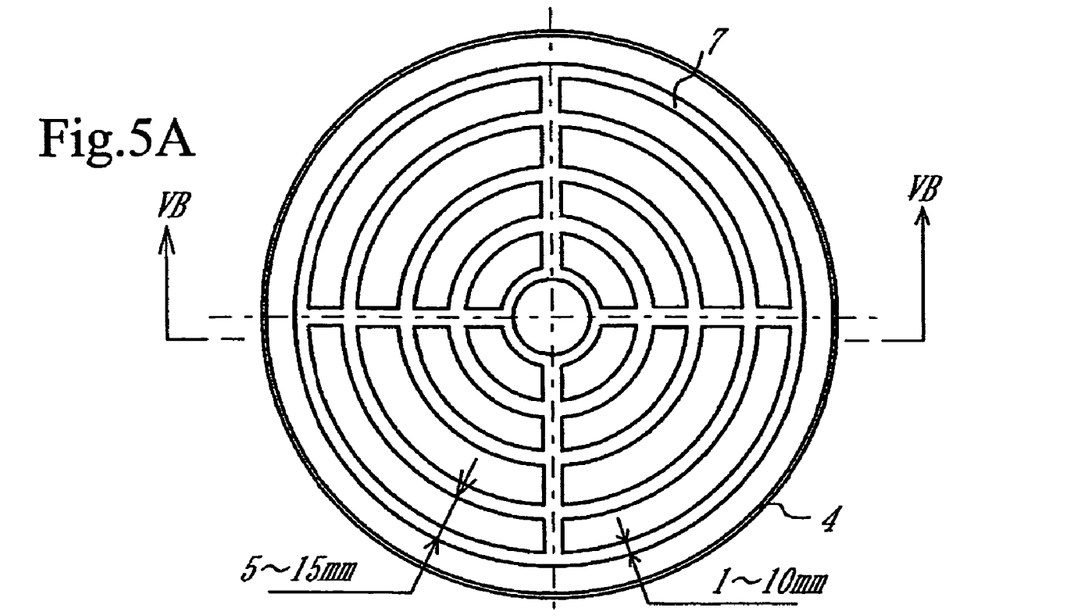
FIGS. 5A and 5B are schematic sectional views showing another vibrating apparatus used in the apparatus for production according to an embodiment of the present invention.
Figure 5B:
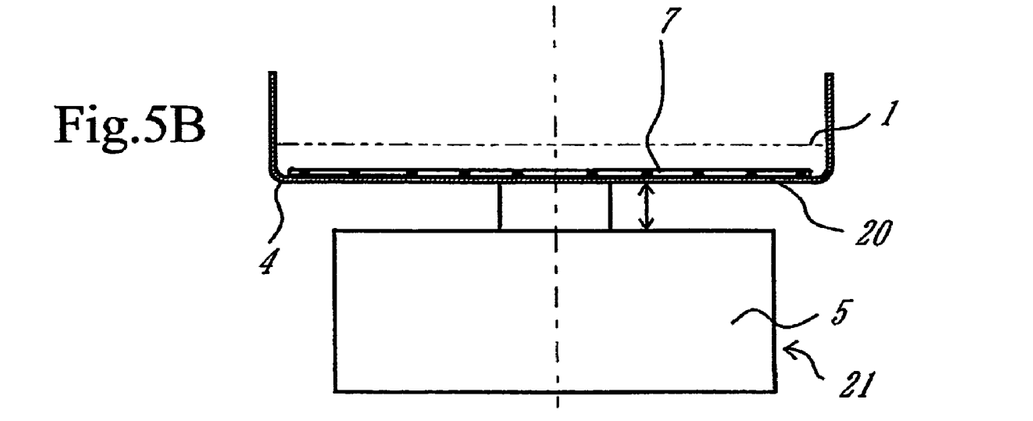

FIGS. 5A and 5B are schematic sectional views showing the vibrating apparatus according to an embodiment of the present invention. This apparatus is provided with the flat object 7 (as the vibration amplifying means) made of wire in concentric form (with each section arranged in the radial direction).

Figure 6A:
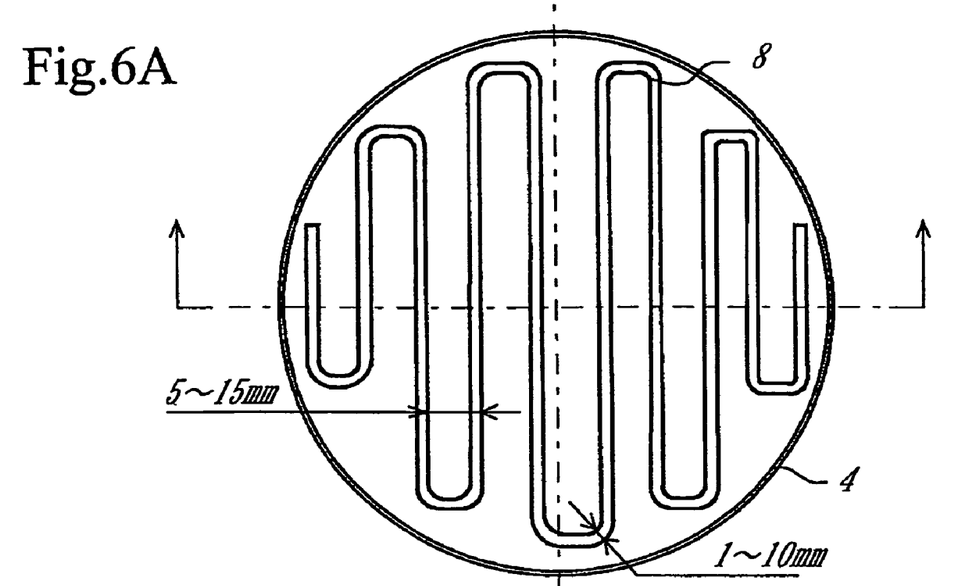
FIGS. 6A and 6B are schematic sectional views showing further another vibrating apparatus used in the apparatus for production according to an embodiment of the present invention.
Figure 6B:
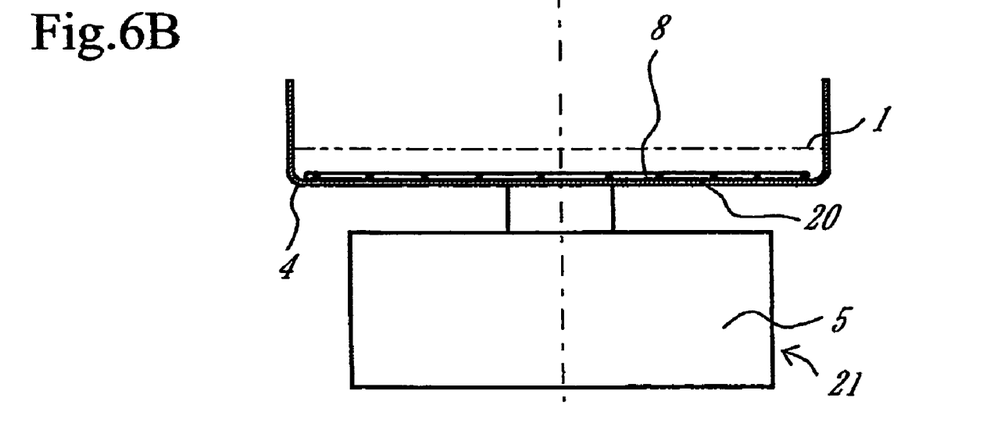

FIGS. 6A and 6B are schematic sectional views showing the vibrating apparatus according to an embodiment of the present invention. This apparatus is provided with the flat object 8 (as the vibration amplifying means) made of wire in turned-around pattern.

All the apparatuses shown in FIGS. 4A and 4B through 6A and 6B cause the conductive powder 1 to vigorously flow by vibration owing to any of the flat objects 6, 7, and 8, because the flat object is installed on the bottom of the container 4, with part of it remaining unfixed, and the conductive powder 1 is placed on and vibrated by the flat object. During vibration, the flat object retains its shape. While being vibrated, the conductive powder 1 undergoes physical vapor deposition such as sputtering. In this way, the conductive powder 1 in the container 4 is thoroughly mixed and uniformly coated with the catalytic substance.

In an embodiment, for the flat object, such as in a spiral pattern, concentric pattern, turned-around pattern or the like, to produce the desired effect, it should be formed from a wire having a diameter of about 1 mm to 10 about mm and it should have an outside diameter smaller by about 5 mm than the inside diameter of the container. In addition, the pattern should be formed such that adjacent wires are about 5 mm to about 15 mm apart. The flat object not meeting these conditions does not achieve the thorough mixing of the conductive powder 1 and hence does not achieve the efficient coating with the catalytic substance.

The above-mentioned flat object formed from wire should preferably have a thickness equivalent to about 10% to about 70% of the thickness of the layer of the conductive powder.

Figure 13A:
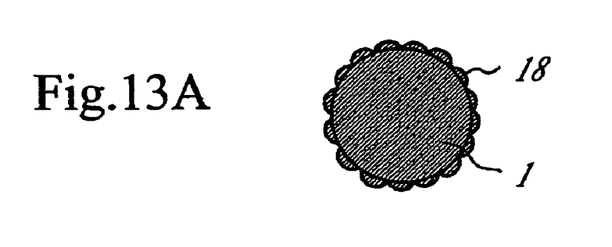
FIGS. 13A and 13B are schematic sectional views showing the conductive catalyst particles obtained by the production process according to an embodiment of the present invention.

The production process according to an embodiment of the present invention affords the conductive catalyst particles in which the catalytic substance 18 adheres only to the surface of the conductive powder 1, effectively without entering pores (not shown) existing in the surface of the conductive powder 1, as shown in FIG. 13A. Therefore, the conductive catalyst particles thus obtained produce the desirable catalytic action even when used in small quantities. Moreover, they have a sufficiently large area for contact between the catalytic substance 18 and gas and hence the catalytic substance 18 has a large specific surface area that contributes to reaction. This leads to the enhanced catalytic performance.

In other words, physical vapor deposition yields conductive catalyst particles in which the catalytic substance 18 adheres to the entire surface of the conductive powder 1, as shown in FIG. 13A. This formation permits the catalytic substance 18 in a small amount to perform a good catalytic function. This formation provides a sufficient area for contact between the catalytic substance 18 and gas, thereby increasing the specific surface area of the catalytic substance 18 which contributes to reaction and hence improving the catalytic performance.

The production process according to an embodiment of the present invention may be modified such that the conductive powder 1 is coated with the ionic conductor 19 and the catalytic substance 18 is deposited on the ionic conductor 19 by physical vapor deposition mentioned above, as shown in FIG. 13B. Unlike the conventional process, the modified process, in which the catalytic substance 18 is deposited by physical vapor deposition, obviates the necessity of performing thermal treatment to improve the crystallinity of the catalytic substance 18 and permits the catalytic substance 18 to deposit without adverse effect on the performance of the ionic conductor 19.

Figure 13B:
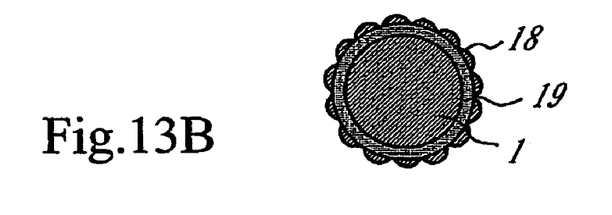

Either of the conductive catalyst particles shown in FIGS. 13A and 13B should preferably carry the catalytic substance 18 in an amount equivalent to about 10 wt % to about 1000 wt % of the conductive powder 1, so that they perform good catalytic action and exhibit good conductivity. In an embodiment, the catalytic substance 18 includes a noble metal, such as Pt, Ir, Rh and/or the like.

The conductive powder 1, in an embodiment, should preferably have an electrical resistance lower than about $10^{-3}$ Ω·m. It may be at least any one selected from carbon, ITO $SnO_2$ and the like. ITO stands for Indium Tin Oxide. It is an conductive oxide obtained by doping indium oxide with tin.

Carbon as the conductive powder 1 includes a specific surface area larger than about 300 $m^2$/g in an embodiment. Any carbon not meeting this requirement would impair the characteristic properties of the conductive catalyst particles.

In addition, carbon as the conductive powder 1 should preferably have good gas permeability which is indicated by an oil absorption value higher than about 200 mL/100 g. Good gas permeability is important for the catalyst electrode capable of gas diffusion which is made with the conductive catalyst particles.

The conductive catalyst particles produced by the process according to an embodiment of the present invention may be formed alone into a catalyst layer by pressing or the like. However, it may also be formed into a film by binding with a resin. The resulting film is composed of a porous gas-permeable current collector and the conductive catalyst powder firmly adhering thereto. Such a film is desirable for the production of the catalyst electrode capable of gas diffusion.

The catalyst electrode capable of gas diffusion may be composed of the conductive catalyst particles almost alone. Alternatively, it may contain, in addition to the conductive catalyst particles, auxiliary components such as resin to bind them. In the latter case, the auxiliary components include a water-repellent resin such as fluorocarbon resin (which contributes to binding performance and water drainage), a pore-forming agent such as $CaCO_3$ (which contributes to gas permeability), and an ionic conductor (which contributes to the mobility of protons and the like). Moreover, the conductive catalyst particles should preferably be supported on a porous gas-permeable current collector (such as carbon sheet).

The catalyst electrode capable of gas diffusion which is produced by the process according to an embodiment of the present invention may be applied to electrochemical devices such as fuel cells and hydrogen generating apparatus.

In an electrical device consisting basically of a first electrode, a second electrode, and an ionic conductor held between them, the catalyst electrode capable of gas diffusion may be used as at least the first of the two electrodes.

To be more specific, the catalyst electrode capable of gas diffusion may be applied to electrochemical devices in which at least one of the two electrodes is a gas electrode.

Figure 7:
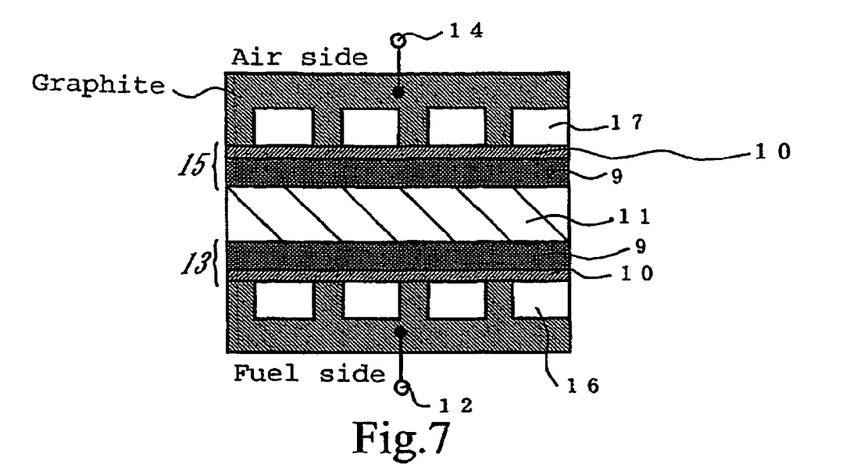
FIG. 7 is a schematic diagram showing the structure of the fuel cell provided with the catalyst electrode capable of gas diffusion which is obtained by the process for producing conductive catalyst particles according to an embodiment of the present invention.

FIG. 7 shows a typical example of fuel cells in which the catalyst electrode capable of gas diffusion is used. The catalyst layer 9 in FIG. 7 is formed from the above-mentioned conductive catalyst particles alone or in combination with an ionic conductor, a water-repellent resin (such as fluorocarbon resin), and a pore-forming agent (such as $CaCO_3$). The conductive catalyst particles are those which are obtained by the process of the present invention in an embodiment, and they are composed of a conductive powder (such as carbon powder) and a catalytic substance (such as platinum) adhering only to the surface thereof. The catalyst layer 9 and its adjacent carbon sheet 10 (as a porous gas-permeable current collector) constitute the porous catalyst electrode capable of gas diffusion, which is the one obtained by the process of the present invention. In a narrow sense, the catalyst layer 9 alone may be called the catalyst electrode capable of gas diffusion. An ionic conductor 11 is held between the first and second electrodes which are the catalyst electrodes capable of gas diffusion.

The fuel cell shown in FIG. 7 has a negative electrode (fuel or hydrogen electrode) 13 connected to a terminal 12, and a positive electrode (oxygen electrode) 15 connected to a terminal 14, with an ionic conductor 11 held between them. The negative electrode (and optionally the positive electrode also) is the catalyst electrode capable of gas diffusion which is obtained by the process according to an embodiment of the present invention. When the fuel cell is in operation, hydrogen passes through the hydrogen passage 16 adjacent to the negative electrode 13. While passing through the passage 16, hydrogen (fuel) gives rise to hydrogen ions. These hydrogen ions, together with hydrogen ions generated by the negative electrode 13 and the ionic conductor 11, migrate to the positive electrode 15, at which they react with oxygen (air) passing through the oxygen passage 17. Thus, there is obtained an electromotive force as desired.

The fuel cell just mentioned above has as the first and second electrodes the catalyst electrode capable of gas diffusion which is obtained by the process of the present invention. Therefore, the electrodes perform good catalytic action and provide a sufficient area for contact between the catalytic substance and gas (hydrogen), allowing the catalytic substance to have a large specific surface area contributing to reaction and to exhibit improved catalytic performance. This imparts good output characteristics to the fuel cell. Another advantage is a high hydrogen ion conductivity, which results from the fact that dissociation of hydrogen ions takes place in the negative electrode 13 and the hydrogen ions supplied from the negative electrode 13 migrate to the positive electrode 15 while dissociation of hydrogen ions is taking place in the ionic conductor 11.

Figure 8:
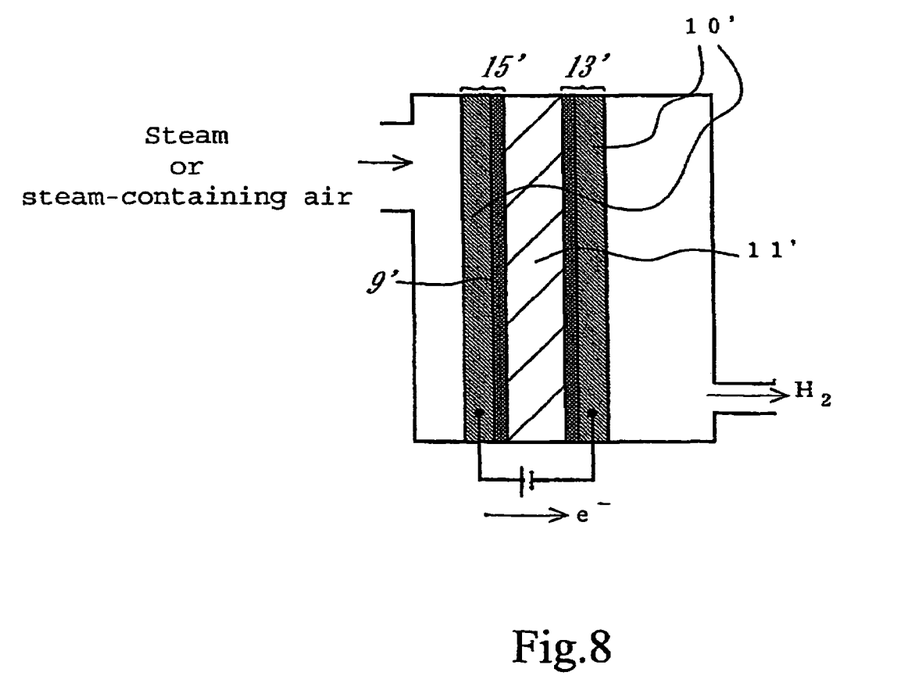
FIG. 8 is a schematic diagram showing the structure of the hydrogen generating apparatus provided with the catalyst electrode capable of gas diffusion which is obtained by the process according to an embodiment of the present invention.

FIG. 8 shows a typical example of hydrogen producing apparatus in which the first and second electrodes are the catalyst electrode capable of gas diffusion which is obtained by the process of the present invention.

Reactions at each electrode take place as follows.

at positive electrode: $H_2O \rightarrow 2H^+ + \frac{1}{2}O_2 + 2e^-$ at negative electrode: $2H^+ + 2e^- \rightarrow H_2 \uparrow$ Theoretically, these reactions generate a voltage higher than 1.23 V.

The catalyst layer 9' in FIG. 8 is formed from the above-mentioned conductive catalyst particles alone or in combination with an ionic conductor, a water-repellent resin (such as fluorocarbon resin), and a pore-forming agent (such as $CaCO_3$). (The conductive catalyst particles are those which are obtained by the process of the present invention, and they are composed of a conductive powder (such as carbon powder) and a catalytic substance (such as platinum) adhering only to the surface thereof. The catalyst layer 9' and its adjacent carbon sheet 10' (as a porous gas-permeable current collector) constitute the porous catalyst electrode capable of gas diffusion, which is the one obtained by the process of the present invention. An ionic conductor 11' is held between the first and second electrodes which are the gas-permeable catalyst electrodes.

When in operation, this hydrogen producing apparatus is supplied with steam or steam-containing air through an inlet close to the positive electrode 15'. The steam or steam-containing air is decomposed by the positive electrode 15' into electrons and protons (hydrogen ions). The generated electrons and protons migrate to the negative electrode 13', by which they are converted into hydrogen gas. In this way there is obtained hydrogen gas as desired.

The hydrogen-producing apparatus mentioned above is characterized in that at least the first of its two electrodes is the catalyst electrode capable of gas diffusion which is obtained by the process according to an embodiment of the present invention. This constitution permits protons and electrons to migrate smoothly through the positive electrode 15' so that hydrogen is generated at the negative electrode 13'.

As mentioned above, the catalyst electrode capable of gas diffusion which is obtained by the process of the present invention employs an ionic conductor, or the electrochemical device employs an ionic conductor held between the first and second electrodes. The ionic conductor can include any suitable material. For example, the ionic conductor includes NAFION (perfluorosulfonic acid resin made by DUPONT) fullerene derivative such as fullerenol, polyfullerene hydroxide, and/or other suitable materials.

Figure 9A:
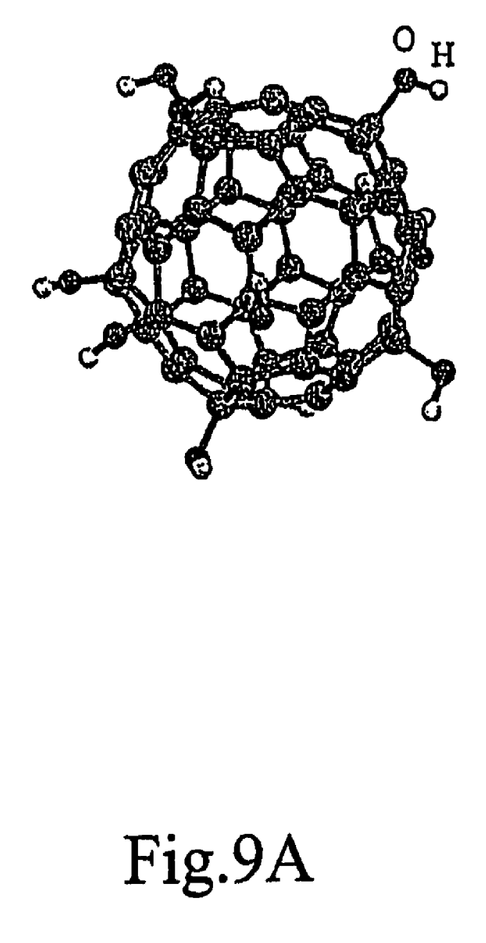
FIGS. 9A and 9B are diagrams showing the structure of the fullerene hydroxide (as an example of fullerene derivatives) which can be used according to an embodiment of the present invention.
Figure 9B:
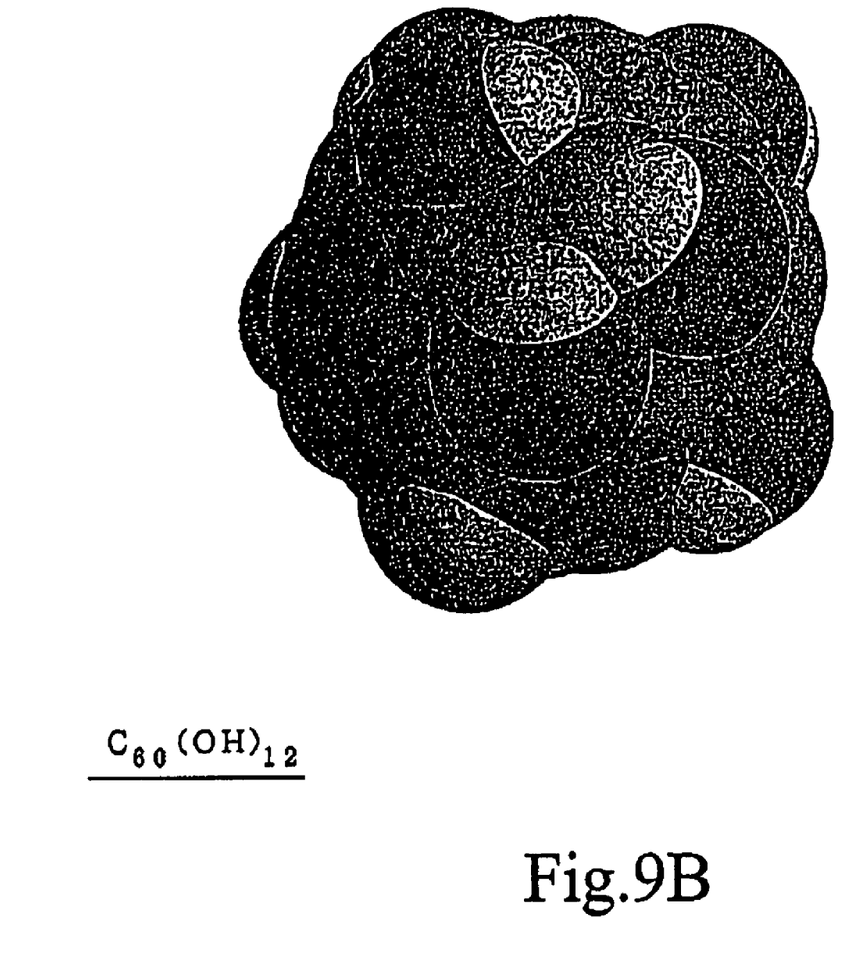

Fullerenol is fullerene having hydroxyl groups attached thereto, as shown in FIGS. 9A and 9B. The first synthesis of this compound was reported in 1992 by Chiang et al. (Chiang, L. Y.; Swirczewski, J. W.; Hsu, C. S.; Chowdhury, S. K.; Cameron, S.; and Creegan, K., J. Chem. Soc, Chem. Commun. 1992, 1791)

Figure 10A:
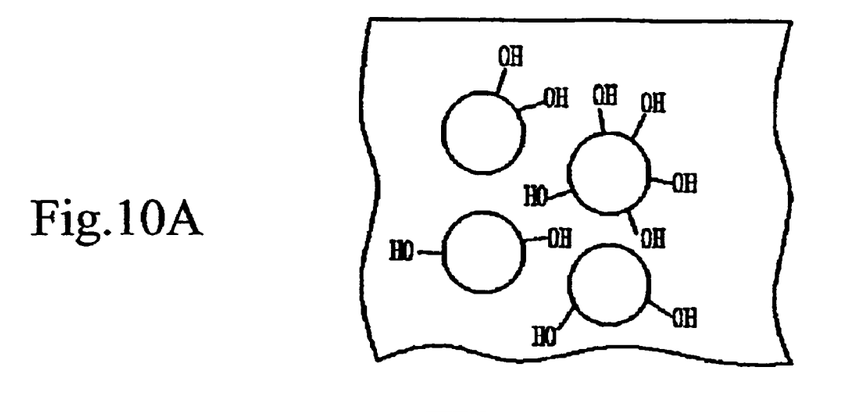
FIGS. 10A and 10B are schematic diagrams showing an example of the fullerene derivatives according to an embodiment of the present invention.

In general, fullerenol can be formed into an aggregate so that hydroxyl groups in adjacent fullerenol molecules react with each other as shown in FIG. 10A (in which a circle denotes a fullerene molecule). The resulting aggregate (as a macroscopic aggregate) exhibits desirable proton conducting characteristics or dissociation of $H^+$ from the phenolic hydroxyl group in the fullerenol molecule.

Figure 10B:
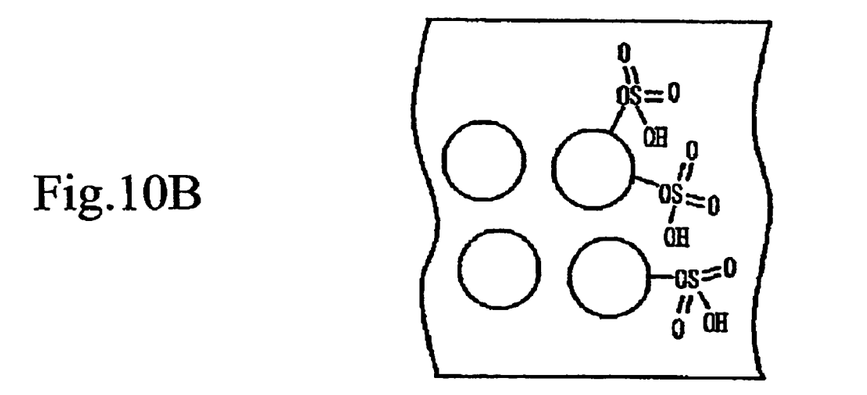

Moreover, the fullerenol as the ionic conductor may be replaced by an aggregate of fullerene having more than one $OSO_3H$ group. This fullerene derivative, in which OH groups are replaced by $OSO_3H$ groups, is hydrogensulfate-esterified fullerenol, as shown in FIG. 10B. See, for example, Chiang. L. Y.; Wang, L. Y.; Swirczewski, J. W.; Soled, S.; and Cameron, S., J. Org. Chem. 1994, 59, 3960. The hydrogensulfate-esterified fullerenol may have $OSO_3H$ groups alone in one molecule or both $OSO_3H$ groups and hydroxyl groups in one molecule.

An aggregate formed from a large number of molecules of fullerenol or hydrogensulfate-esterified fullerenol exhibits proton conductivity as the property of a bulk material. This proton conductivity directly involves migration of protons derived from a large number of hydroxyl groups (which originally exist in molecules) and $OSO_3H$ groups. Therefore, this proton conductivity does not need to rely on hydrogen (or protons) originating from steam molecules supplied from the atmosphere. In other words, the proton conductivity manifests itself without supply of water from the outside or absorption of moisture from the air. This permits continuous use even in a dry atmosphere regardless of the environment.

A probable reason for the significant proton conductivity of the fullerene derivatives mentioned above is that fullerene as the base shows conspicuous electrophilicity which greatly promotes the electrolytic dissociation of hydrogen ions from the hydroxyl groups as well as from the highly acidic $OSO_3H$ groups. In addition, the proton conductivity can be effectively increased because each fullerene molecule can accept a considerable number of hydroxyl groups and $OSO_3H$ groups, so that the number of protons involved in conduction is very large per unit volume of the conductor.

The fullerenol and hydrogensulfate-esterified fullerenol mentioned above is composed mainly of carbon atoms arising from fullerene. Therefore, they are light in weight, stable in quality, and free of contaminants. In addition, fullerene itself is rapidly decreasing in production cost. The foregoing makes fullerene a nearly ideal carbonaceous material standing above other materials from the standpoint of resource, environment, and economy.

Other fullerene derivatives than mentioned above may also be used, which have any of —COOH, —SO$_3$H, —OPO(OH)$_2$ and the like in place of —OH and —OSO$_3$H.

The fullerenol or fullerene derivative mentioned above may be obtained by treating fullerene powder with an acid or hydrolyzing fullerene. Any known process can attach desired groups to carbon atoms constituting fullerene molecules.

The fullerene derivative used as the ionic conductor mentioned above may be in the form of simple body (composed of fullerene derivative almost alone) or in the form of lump solidified with a binder.

The fullerene derivative may be made into a film by press-forming, so that the resulting film serves as the ionic conductor held between the first and second electrodes. This ionic conductor in film form may be replaced by the one which is obtained from a lump of fullerene derivative solidified with a binder. In this case, the ionic conductor has a sufficient strength.

The binder mentioned above may be one or more than one kind of any known polymeric material capable of forming film. It should be used in an amount less than about 20 wt % of the ionic conductor; it will deteriorate the conductivity of hydrogen ions if used in an amount more than about 20 wt %.

The ionic conductor composed of the fullerene derivative and a binder permits conduction of hydrogen ions in the same way as that composed of the fullerene derivative alone. In addition, owing to the film-forming polymeric material contained therein, the former is stronger than the latter (which is formed by compression from the fullerene derivative in powder form). It is a flexible ion-conducting thin film (usually thinner than 300 μm) capable of blocking gas permeation.

The polymeric material mentioned above is not specifically restricted so long as it forms a film without inhibiting the hydrogen ion conductivity (by reaction with the fullerene derivative). It should preferably be one which is stable without electron conductivity. It includes, for example, polyfluoroethylene, polyvinylidene fluoride, polyvinyl alcohol and the like, which are desirable for reasons given below.

Polyfluoroethylene is desirable because it permits the fullerene derivative to be formed into a strong thin film more easily with a less amount than other polymeric materials. It produces its effect only with a small amount of about 3 wt %, preferably about 0.5 wt % to about 1.5 wt %. It gives a thin film ranging from about 100 μm down to about 1 μm in thickness.

Polyvinylidene fluoride and polyvinyl alcohol are desirable because they give an ion-conducting thin film with a remarkable ability to block gas permeation. In an embodiment, they are used in an amount of about 5 wt % to about 15 wt %.

The above-mentioned polymeric materials may adversely affect their film-forming performance if they are used in an amount less than the lower limit of the range mentioned above.

The thin film for the ionic conductor composed of the fullerene derivative and the binder may be obtained by any known film-forming process such as compression molding and extrusion molding.

The invention will be described in more detail with reference to the following examples.

EXAMPLE 1

An apparatus shown in FIG. 1 was assembled from a sputtering target, a vibrator, and a container. The container was charged with a conductive powder and balls. The sputtering target is a platinum disc 100 mm in diameter. The balls are stainless steel balls 3 mm in diameter. The conductive powder is a carbon powder having a specific surface area of 800 m$^2$/g and an oil absorption value of 360 mL/100 g. The vibrator generates vibration with an amplitude of ±5 mm and a frequency of 36 Hz.

The container was charged with the carbon powder (1 g) and the stainless steel balls (35 g). Sputtering was carried out for 30 minutes while the carbon powder and stainless steel balls were being vibrated by the vibrator, with the vacuum chamber supplied with argon (1 Pa) and the target activated by 400W RF. After sputtering, it was found that the carbon powder increased in weight to 1.66 g owing to deposition of platinum (0.66 g) thereon. This implies that the treated carbon powder carries platinum as much as 40 wt %.

A carbon sheet was coated with a mixture of teflon binder and carbon (not carrying platinum) dispersed in a solvent such that the coating layer was 20 μm thick after drying. This coating was used as a layer to prevent spreading.

The platinum-carrying carbon powder, which was obtained as mentioned above, was mixed with perfluorosulfonic acid resin (as a binder) and n-propyl alcohol (as an organic solvent). The resulting mixture was applied to that side of the carbon sheet on which the layer to prevent spreading was formed. After drying, the coating layer was 10 μm thick. The thus obtained sheet was used in this example as the catalyst electrode capable of gas diffusion. A fuel cell as shown in FIG. 7 was made, in which the catalyst electrode capable of gas diffusion was placed on both sides of the ion-exchange membrane (of perfluorosulfonic acid resin). The resulting fuel cell was tested for output. The output (in terms of mW/cm$^2$) achieved by the fuel cell in this example is regarded as the standard (100%) for relative values.

EXAMPLE 2

An apparatus as shown in FIGS. 4A and 4B was assembled from a sputtering target, a vibrator, a container, and a device made of spirally wound wire. The wire is a stainless steel wire 1.6 mm in diameter. The wire is wound at a pitch of about 5 mm to about 10 mm. The outside diameter of the spiral is smaller by about 5 mm than the inside diameter of the container. The conductive powder (carbon powder) mentioned above was placed on the device of spirally wound wire. Being not fixed to the bottom of the container, this device vibrated together with the carbon powder during sputtering to coat the carbon powder with platinum.

A fuel cell as shown in FIG. 7 was made in the same way as in Example 1 except that the carbon powder was coated with platinum by using the apparatus mentioned above. The obtained fuel cell was tested for output. The output was 120% of that in Example 1.

EXAMPLE 3

A fuel cell shown in FIG. 7 was made in the same way as in Example 1 except that the carbon powder (which carries platinum) was replaced by the one which has an oil absorption value of 150 mL/100 g. The obtained fuel cell was tested for output. The output was 65% of that in Example 1.

EXAMPLE 4

A fuel cell shown in FIG. 7 was made in the same way as in Example 1 except that the carbon powder (which carries platinum) was replaced by the one which has a specific surface area of 200 m$^2$/g. The obtained fuel cell was tested for output. The output was 65% of that in Example 1.

COMPARATIVE EXAMPLE 1

Platinum coating on the carbon powder was accomplished by the liquid phase method in the following manner. The carbon powder was immersed in an aqueous solution of hexaamineplatinum(IV) chloride ([Pt(IV)(NH$_3$)$_6$]Cl$_4$) containing 10 g/L of platinum at room temperature for 1 hour. Then, the carbon powder was washed and heated at 180° C. in a hydrogen stream for reduction of the platinum salt. Thus there was obtained a platinum-carrying carbon powder. A fuel cell shown in FIG. 7 was made in the same way as in Example 1 except that platinum-carrying carbon powder was used as the conductive catalyst particles. The thus obtained fuel cell was tested for output. The output was 50% of that in Example 1.

COMPARATIVE EXAMPLE 2

A fuel cell shown in FIG. 7 was made in the same way as in Example 1 except that the carbon powder was coated with platinum by sputtering without balls (as the vibration amplifying means) and the carbon powder was not vibrated. The thus obtained fuel cell was tested for output. The output was 30% of that in Example 1.

COMPARATIVE EXAMPLE 3

A fuel cell shown in FIG. 7 was made in the same way as in Example 1 except that the carbon powder (as the conductive powder) was coated with platinum by sputtering without balls in the vibrating apparatus (only the carbon powder was vibrated). The thus obtained fuel cell was tested for output. The output was 60% of that in Example 1.

It is apparent from the foregoing that the production process according to an embodiment of the present invention permits uniform platinum coating on carbon powder. This is because carbon powder (as a conductive powder), together with balls (as a vibration amplifying means), is placed in a vibrating container and is coated with platinum by sputtering (as physical vapor deposition) while they are being vibrated. Vibration in this manner keeps the carbon powder moving without settling on the bottom of the container. The thus obtained platinum-coated carbon powder (as conductive catalyst particles) is suitable for the catalyst electrode capable of gas diffusion which is built into a high-output fuel cell.

The production process according to an embodiment of the present invention includes coating carbon powder with platinum (as a catalytic substance) by physical vapor deposition (sputtering). This process permits platinum with good crystallinity to adhere only to the surface of the carbon powder at a low temperature. Therefore, the resulting conductive catalyst particles produce good catalytic action for its small amount. In addition, they provide a sufficient area for contact between platinum and gas, making platinum have a large specific surface area for reaction. This leads to improved catalytic performance. Thus, as a constituent of the catalyst electrode capable of gas diffusion, they contribute to a high-output fuel cell.

The fuel cell in Example 3 has a low output on account of poor gas permeability resulting from the carbon powder to carry platinum having an oil absorption value of 150 mL/100 g which is lower than 200 mL/100 g specified in the present invention.

The fuel cell in Example 4 has a low output on account of unsatisfactory conductive catalyst particles resulting from the carbon powder to carry platinum having a specific surface area of 200 m$^2$/g which is smaller than 300 m$^2$/g specified in the present invention.

The fuel cell in Comparative Example 1 is poor in catalyst efficiency because platinum coating on carbon powder was carried out by the liquid phase method which causes platinum to exist as unstable spheres on the surface of carbon powder.

The fuel cell in Comparative Example 2 has a low output on account of the uneven platinum coating on carbon powder which results from sputtering without vibration and balls (as the vibration amplifying means). Sputtering in this manner merely deposits platinum on carbon powder existing in the surface layer in the container.

The fuel cell in Comparative Example 3 has a low output on account of the uneven platinum coating on carbon powder which results from sputtering without balls (as the vibration amplifying means). Sputtering in this manner does not uniformly deposit platinum on the entire carbon powder in the container.

The above-mentioned embodiments may be variously modified as follows within the scope of the present invention.

For example, the balls or the spirally wound device used as the vibration amplifying means may be replaced by a device made of a wire which is concentrically wound as shown in FIGS. 5A and 5B or by a device made of a wire which is turned-around as shown in FIGS. 6A and 6B. Both of them produce good results as in Example 2.

Moreover, the carbon powder used as the conductive powder may be replaced by ITO SnO$_2$ and/or the like.

Further, the catalyst electrode capable of gas diffusion which is produced according to the present invention is assumed to be used for the fuel cell as explained above. However, it may also be used for the hydrogen-producing apparatus in which the reaction in the fuel cell is reversed.

The process according to an embodiment of the present invention includes coating the conductive powder with the catalytic substance by physical vapor deposition by vibrating it together with the vibration amplifying device on the vibrating plane. Vibration in this manner ensures thorough mixing up and down, without the conductive powder partially staying still on the vibrating plane. The result of thorough mixing is uniform coating of the catalytic substance on the conductive powder.

The advantage of the physical vapor deposition used to coat the surface of the conductive powder with the catalytic substance is that the catalytic substance with good crystallinity adheres at a low temperature only to the surface of the conductive powder. The resulting conductive catalyst particles produce a good catalytic action even when used in small quantities. In addition, they provide a sufficient area for contact between the catalytic substance and gas. That is, they have a large specific surface area for reactions and hence exhibit improved catalytic performance.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A process for producing conductive catalyst particles, the process comprising causing a catalytic substance to adhere to a surface of a conductive powder by physical vapor deposition while vibrating the conductive powder, wherein the conductive powder undergoes vibration together with vibration amplifying means arranged on a vibrating plane, wherein the vibration amplifying means includes one or more balls, wherein the conductive powder is mixed with the balls and wherein the resulting mixture is placed in a container so that the resulting mixture undergoes the vibration.

2. The process for producing conductive catalyst particles as defined in claim 1, wherein the balls are selected from the group consisting of ceramic, and metallic balls, and wherein the balls range from about 1 mm to about 10 mm in diameter.

3. The process for producing conductive catalyst particles as defined in claim 1, wherein the conductive powder and the vibration amplifying means are vibrated by a vibrator at a frequency that ranges from about 5 Hz to about 200 Hz.

4. The process for producing conductive catalyst particles as defined in claim 1, wherein the physical vapor deposition includes a sputtering process that employs the catalytic substance as a target.

5. The process for producing conductive catalyst particles as defined in claim 1, wherein the physical vapor deposition includes a pulsed laser deposition process.

6. The process for producing conductive catalyst particles as defined in claim 1, wherein the conductive powder is coated with the catalytic substance in a ratio of about 10 wt % to about 1000 wt %.

7. The process for producing conductive catalyst particles as defined in claim 1, wherein the catalytic substance includes a noble metal selected from the group consisting of Pt, Ir, Rh and combinations thereof.

8. The process for producing conductive catalyst particles as defined in claim 1, wherein the conductive powder is coated with the catalytic substance by the physical vapor deposition process after it has been coated with an ionic conductor.

9. The process for producing conductive catalyst particles as defined in claim 1, wherein the conductive powder includes an electric resistance lower than about $10^{-3}$ $\Omega \cdot m$.

10. The process for producing conductive catalyst particles as defined in claim 1, wherein the conductive powder is selected from the group consisting of carbon, Indium Tin Oxide, a conductive oxide obtained by doping indium oxide with tin, and $SnO_2$.

11. The process for producing conductive catalyst particles as defined in claim 10, wherein the carbon has a specific surface area greater than about 300 $m_2/g$.

12. The process for producing conductive catalyst particles as defined in claim 10, wherein the carbon has an oil absorption value greater than about 200 mL/100 g.

13. A process for producing conductive catalyst particles, the process comprising causing a catalytic substance to adhere to a surface of a conductive powder by physical vapor deposition while vibrating the conductive powder, wherein the conductive powder undergoes vibration together with vibration amplifying means arranged on a vibrating plane, wherein the vibration amplifying means includes a flat object composed of wire in a form that is at least one of a spiral, a concentric circle, and a turned-around pattern, and wherein the flat object is installed on a bottom of a container in such a way that at least a portion thereof remains unfixed, so that the conductive powder undergoes vibration around the flat object.

14. The process for producing conductive catalyst particles as defined in claim 13, wherein the flat object is formed from a wire that ranges from about 1 mm to about 10 mm in diameter.

15. The process for producing conductive catalyst particles as defined in claim 13, wherein the flat object has an outside diameter smaller by about 5 mm than an inside diameter of the container and wherein the pattern is formed such that adjacent wires are spaced apart about 5 mm to about 15 mm.

16. A process for producing conductive catalyst particles, the process comprising causing a catalytic substance to adhere to a surface of a conductive powder by physical vapor deposition while vibrating the conductive powder, wherein the conductive powder undergoes vibration together with vibration amplifying means arranged on a vibrating plane, wherein the conductive powder has a layer thickness equivalent to about 10% to about 70% of any one of the thickness and the diameter of the vibration amplifying means.

17. A process for producing conductive catalyst particles, the process comprising causing a catalytic substance to adhere to a surface of a conductive powder by physical vapor deposition while vibrating the conductive powder, wherein the conductive powder undergoes vibration together with vibration amplifying means arranged on a vibrating plane, wherein the vibration amplifying means has a total area equivalent to about 30% to about 80% of the region in which the conductive powder exists.

18. A process for producing conductive catalyst particles, the process comprising causing a catalytic substance to adhere to a surface of a conductive powder by physical vapor deposition while vibrating the conductive powder, wherein the conductive powder undergoes vibration together with vibration amplifying means arranged on a vibrating plane, wherein the conductive powder and the vibration amplifying means are vibrated by a vibrator at an amplitude that ranges from about ±(0.5 to 20) mm.

19. A process for producing a catalyst electrode capable of gas diffusion, the process comprising the steps of: causing a catalytic substance to adhere to a surface of a conductive powder by physical vapor deposition while vibrating the conductive powder together with vibration amplifying means on a vibrating plane, thereby producing one or more conductive catalyst particles and preparing the catalyst electrode with the conductive catalyst particles, wherein the vibration amplifying means includes one or more balls, wherein the conductive powder is mixed with the balls, and wherein the resulting mixture is placed in a container so that the resulting mixture undergoes the vibration.

20. The process for producing a catalyst electrode capable of gas diffusion as defined in claim 19, wherein the balls include at least one of ceramic balls and metallic balls and wherein the balls range from about 1 mm to about 10 mm in diameter.

21. The process for producing a catalyst electrode capable of gas diffusion as defined in claim 19, wherein the conductive powder and the vibration amplifying means are vibrated by a vibrator at a frequency that ranges from about 5 Hz to about 200 Hz.

22. The process for producing a catalyst electrode capable of gas diffusion as defined in claim 19, wherein the physical vapor deposition is a sputtering process employs the catalytic substance as a target.

23. The process for producing a catalyst electrode capable of gas diffusion as defined in claim 19, wherein the physical vapor deposition includes a pulsed laser deposition process.

24. The process for producing a catalyst electrode capable of gas diffusion as defined in claim 19, wherein the conductive powder is coated with the catalytic substance in a ratio that ranges from about 10 wt % to about 1000 wt %.

25. The process for producing a catalyst electrode capable of gas diffusion as defined in claim 19, wherein the catalytic substance is a noble metal selected from the group consisting of Pt, Ir, Rh and combinations thereof.

26. The process for producing a catalyst electrode capable of gas diffusion as defined in claim 19, wherein the conductive powder is coated with the catalytic substance by the physical vapor deposition process after it has been coated with an ionic conductor.

27. The process for producing a catalyst electrode capable of gas diffusion as defined in claim 19, wherein the conductive powder is one which has an electric resistance lower than about $10^-$ Ω·m.

28. The process for producing a catalyst electrode capable of gas diffusion as defined in claim 19, wherein the conductive powder is selected from the group consisting of carbon, Indium Tin Oxide, a conductive oxide obtained by doping indium oxide with tin, $SnO_2$ and combinations thereof.

29. The process for producing a catalyst electrode capable of gas diffusion as defined in claim 28, wherein the carbon a specific surface area greater than about 300 $m^2/g$.

30. The process for producing a catalyst electrode capable of gas diffusion as defined in claim 28, wherein the carbon has an oil absorption value greater than about 200 mL/100 g.

31. The process for producing a catalyst electrode capable of gas diffusion as defined in claim 19, wherein the conductive catalyst particles are bound with a resin.

32. The process for producing a catalyst electrode capable of gas diffusion as defined in claim 19, wherein the conductive catalyst particles are attached onto a current collector.

33. A process for producing a catalyst electrode capable of gas diffusion, the process comprising the steps of: causing a catalytic substance to adhere to a surface of a conductive powder by physical vapor deposition while vibrating the conductive powder together with vibration amplifying means on a vibrating plane, thereby producing one or more conductive catalyst particles and preparing the catalyst electrode with the conductive catalyst particles, wherein the vibration amplifying means includes a flat object of wire in a form that includes any one of a spiral, a concentric circle, or a turned-around pattern, and wherein the flat object is installed on a bottom of a container in such a way that at least a portion thereof remains unfixed, so that the conductive powder undergoes vibration around this flat object.

34. The process for producing a catalyst electrode capable of gas diffusion as defined in claim 33, wherein the flat object of wire is formed from a wire that ranges from about 1 mm to about 10 mm in diameter.

35. The process for producing a catalyst electrode capable of gas diffusion as defined in claim 33, wherein the flat object has an outside diameter smaller by about 5 mm than an inside diameter of the container and wherein the pattern is formed such that adjacent wires are spaced apart from about 5 mm to about 15 mm.

36. A process for producing a catalyst electrode capable of gas diffusion, the process comprising the steps of: causing a catalytic substance to adhere to a surface of a conductive powder by physical vapor deposition while vibrating the conductive powder together with vibration amplifying means on a vibrating plane, thereby producing one or more conductive catalyst particles and preparing the catalyst electrode with the conductive catalyst particles, wherein the conductive powder has a layer thickness equivalent to about 10% to about 70% of any one of the thickness and diameter of the vibration amplifying means.

37. A process for producing a catalyst electrode capable of gas diffusion, the process comprising the steps of: causing a catalytic substance to adhere to a surface of a conductive powder by physical vapor deposition while vibrating the conductive powder together with vibration amplifying means on a vibrating plane, thereby producing one or more conductive catalyst particles and preparing the catalyst electrode with the conductive catalyst particles, wherein the vibration amplifying means has a total area equivalent to about 30% to about 80% of a region in which the conductive powder exists.

38. A process for producing a catalyst electrode capable of gas diffusion, the process comprising the steps of: causing a catalytic substance to adhere to a surface of a conductive powder by physical vapor deposition while vibrating the conductive powder together with vibration amplifying means on a vibrating plane, thereby producing one or more conductive catalyst particles and preparing the catalyst electrode with the conductive catalyst particles, wherein the conductive powder and the vibration amplifying means are vibrated by a vibrator at an amplitude that ranges from about ±(0.5 to 20) mm.

39. A process for producing conductive catalyst particles, the process comprising the steps of vibrating a conductive powder and one or more balls together; and coating the conductive powder with a catalytic substance by physical vapor deposition.

40. The process for producing conductive catalyst particles as defined in claim 39, wherein the physical vapor deposition includes any one of vacuum vapor deposition, sputtering, and pulsed laser deposition.

* * * * *